United States Patent
Sun

(10) Patent No.: US 7,446,954 B2
(45) Date of Patent: *Nov. 4, 2008

(54) HYBRID LENS SYSTEM

(75) Inventor: Wen-Hsin Sun, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/454,544

(22) Filed: Jun. 16, 2006

(65) Prior Publication Data

US 2007/0058256 A1    Mar. 15, 2007

(30) Foreign Application Priority Data

Sep. 9, 2005    (CN) .......................... 2005 1 0037235

(51) Int. Cl.
*G02B 9/34* (2006.01)
(52) U.S. Cl. .................... 359/773; 359/715; 359/569
(58) Field of Classification Search ............... 359/715, 359/773, 569
See application file for complete search history.

(56) References Cited

U.S. PATENT DOCUMENTS

| | | | |
|---|---|---|---|
| 3,944,337 A | 3/1976 | Ruben | |
| 5,327,290 A * | 7/1994 | Fukushima et al. | 359/692 |
| 5,581,405 A * | 12/1996 | Meyers et al. | 359/571 |
| 6,282,033 B1 | 8/2001 | Ning | |
| 2005/0105194 A1 | 5/2005 | Matsui et al. | |
| 2006/0291061 A1* | 12/2006 | Iyama et al. | 359/614 |
| 2007/0070234 A1* | 3/2007 | Sun | 348/335 |

FOREIGN PATENT DOCUMENTS

| | | |
|---|---|---|
| CN | 2577302 Y | 10/2003 |
| CN | 2607703 Y | 3/2004 |

* cited by examiner

*Primary Examiner*—Joshua L Pritchett
(74) *Attorney, Agent, or Firm*—Andrew C. Cheng

(57) ABSTRACT

A hybrid lens system includes: a first lens with positive diffractive power, a second lens with negative diffractive power, a third lens with positive diffractive power, and a fourth lens with negative diffractive power. The first lens, the second lens, the third lens and the fourth lens are aligned in that order from an object side to an image side. The first lens is made from a glass material, each of the second lens, the third lens and the fourth lens is made from a plastic material. All of the four lenses are aspheric lenses.

19 Claims, 3 Drawing Sheets

HYBRID LENS SYSTEM

CROSS REFERENCE

This application relates to a co-filed, co-assigned application entitled "Image Pick-Up Lens System" with application Ser. No. 11/454,490, filed on Jun. 16, 2006, hereby incorporated by reference thereto.

TECHNICAL FIELD

The present invention relates to lens systems, and more particularly to a hybrid lens system.

BACKGROUND

Lens systems used in typical cameras can be divided into three categories as glass lens systems, plastic lens systems and hybrid lens systems. In recent years, cameras have begun to be incorporated in portable terminals such as mobile phones and laptop computers. When being applied in portable terminals, lens systems need to satisfy the oft-conflicting requirements of low cost, lightweight, and excellent optical performance, for example, high-resolution. However, glass lens systems are difficult to satisfy the low cost and lightweight requirements. Plastic lens systems can satisfy the low cost and lightweight requirements, but the plastic lens systems are prone to be affected by outside environment, scratch resistance and temperature endurance of outside lenses of the plastic lens systems are relatively low.

In typical hybrid lens systems, glass lenses and plastic lenses are aligned differently. One typical hybrid lens system includes, from an object side to an image side, a biconvex first lens with positive refracting power, a biconcave second lens with negative refracting power, and a biconvex third lens with positive refracting power. The first lens and the second lens are made from plastic material, and both have aspheric surfaces. The third lens is made from glass material. Therefore, the hybrid lens system can reduce cost and correct aberrations in a certain extent. However, the first lens as the outside lens is made from plastic materials, scratch resistance and temperature endurance thereof are relatively low. Another typical hybrid lens system is provided. The hybrid lens system is consisted of a first lens, a second lens, and a third lens. The first lens and the second lens are spherical lenses made from glass material. The third lens is made from plastic material and has aspheric surfaces on both surfaces. However, the hybrid lens system is difficult to satisfy a high-resolution requirement.

What is needed, therefore, a hybrid lens system which has high scratch resistance and excellent optical performance is desired.

SUMMARY

In a preferred embodiment, a hybrid lens system includes: a first lens with positive diffractive power, a second lens with negative diffractive power, a third lens with positive diffractive power, and a fourth lens with negative diffractive power. The first lens, the second lens, the third lens and the fourth lens are aligned in that order from an object side to an image side. The first lens is made from a glass material, each of the second lens, the third lens and the fourth lens is made from a plastic material. All of the four lenses are aspheric lenses.

Other advantages and novel features will become more apparent from the following detailed description when taken in conjunction with the accompanying drawings, in which:

BRIEF DESCRIPTION OF THE DRAWINGS

Many aspects of the present hybrid lens system can be better understood with reference to the following drawings. The components in the drawings are not necessarily to scale, the emphasis instead being placed upon clearly illustrating the principles of the present hybrid lens system. Moreover, in the drawings, like reference numerals designate corresponding parts throughout the several views.

The exemplifications set out herein illustrate at least one preferred embodiment of the invention, in one form, and such explications are not to be construed as limiting the scope of the invention in any manner.

DETAILED DESCRIPTION OF PREFERRED EMBODIMENTS

Embodiments of the present invention will now be described in detail below and with reference to the drawings.

Figure 1:
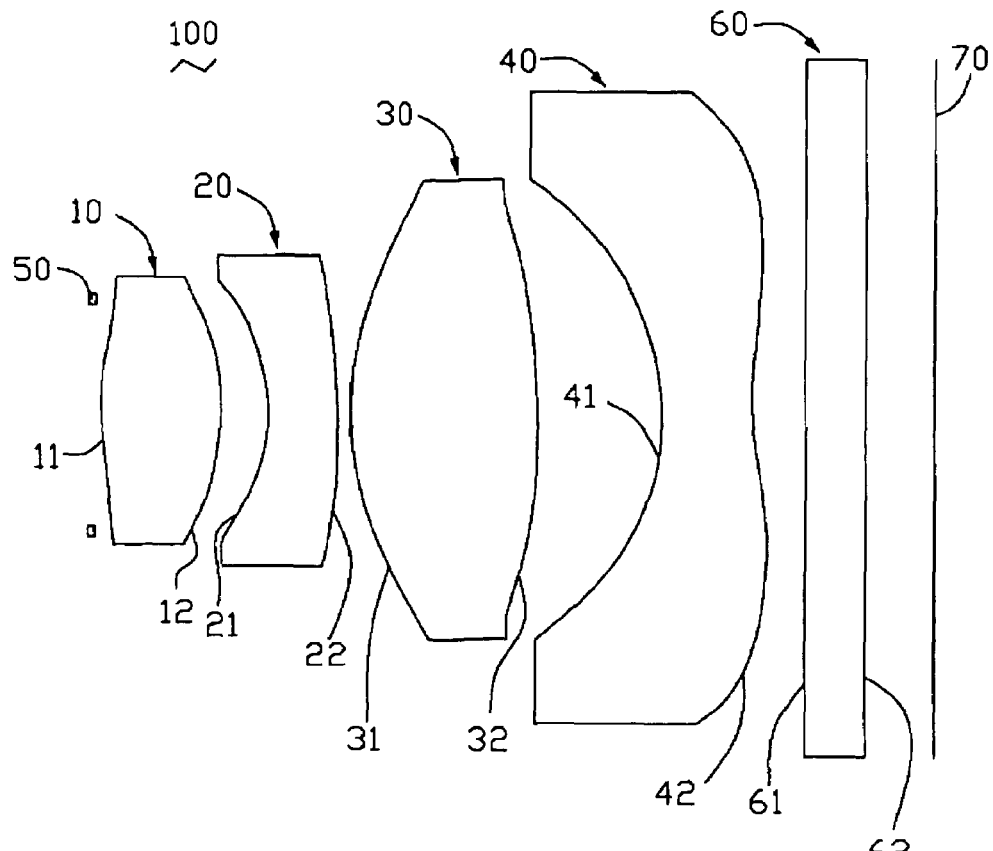
FIG. 1 is a schematic, cross-sectional view of a hybrid lens system in accordance with a preferred embodiment, and also showing a cover glass and an image pick-up surface.

Referring to FIG. 1, a hybrid lens system 100 according to a preferred embodiment is provided. The hybrid lens system 100 includes: a positive first lens 10, a negative second lens 20, a positive third lens 30, a negative fourth lens 40, an aperture stop 50, and a cover glass 60. An image pickup device 70 is also provided. The aperture stop 50, the positive first lens 10, the negative second lens 20, the positive third lens 30, the negative fourth lens 40, the cover glass 60, and the image pickup device 70 are aligned in that order from an object side to an image side.

The first lens 10 is a biconvex lens with a convex first surface 11 and a convex second surface 12. The first surface 11 or the second surface 12 may further include an infrared-cut film formed thereon. The first lens 10 is made from a glass material, which has a refractive index $n_1=1.58313$ at d-line (light of wavelength 587.6 nanometers), and an Abbe number $v_1=59.4$ at d-line. The second lens 20 is a meniscus-shaped lens with a concave third surface 21 facing the object side and a convex fourth surface 22. The second lens 20 is made from an optical plastic, which has a refractive index $n_2=1.60726$ at d-line, and an Abbe number $v_2=26.645$ at d-line. The positive third lens 30 is a biconvex lens with a convex fifth surface 31 and a convex sixth surface 32. The fourth lens 40 is a biconvex lens with a concave seventh surface 41 and a concave eighth surface 42. The third lens 30 and the fourth lens 40 are made from a same optical plastic, which has a refractive index $n_3=1.53116$ at d-line, and an Abbe number $v_3=56.4$ at d-line. Each of the four lenses 10, 20, 30 and 40 is aspheric on both surfaces thereof. The cover glass 60 is plate-shaped and includes a planar ninth surface 61 and a planar tenth surface 62. The cover glass 60 is made of a transparent glass material. The planar ninth surface 61 or the planar tenth surface 62 may further include an infrared-cut film formed thereon. The first surface 31, the second surface 12, the third surface 21, the fourth surface 22, the fifth surface 11, the sixth surface 32, seventh surface 41, the eighth surface 42, the ninth surface 61 and the tenth surface 62 are aligned in that order from the object side to the image side.

The image pickup device 70 may employ a CCD (Charged Coupled Device) sensor or a CMOS (Complementary Metal Oxide Semiconductor) sensor. In the preferred embodiment, a four-megapixel CMOS sensor is employed as the image pickup device 70 according to the low cost requirement. A half length of a diagonal line of the CMOS sensor is 3.18 millimeters (mm). That means the max image height on the CMOS is 3.18 mm.

The following are symbols used in the exemplary embodiment.

r: radius of curvature
d: distance between adjacent two surfaces on the optical axis of the system
Φ: diameter
k: conic constant In the preferred embodiment, the hybrid lens system 100 satisfies the data in Table 1 and Table 2.

TABLE 1

| Surface | r (mm) | d (mm) | Φ (mm) | k | lens material (type) |
|---|---|---|---|---|---|
| stop 50 | ∞ | 0.03398873 | 1.967867 | 0 | — |
| 1st | 7.312152 | 1.358034 | 2.048028 | 0 | Glass |
| 2nd | −2.571817 | 0.6735465 | 2.659565 | 0 | (L-BAL42) |
| 3rd | −1.527524 | 0.6008621 | 2.69724 | 0 | Plastic (OKP4) |
| 4th | −6.545839 | 0.6766579 | 3.431644 | 0 | |
| 5th | 4.508254 | 1.770372 | 4.337425 | 0 | Plastic (E48R) |
| 6th | −2.370574 | 0.7833835 | 4.166895 | 0 | |
| 7th | −2.180037 | 1.033449 | 4.150956 | 0 | Plastic (E48R) |
| 8th | 13.91974 | 0.2239849 | 5.816513 | 0 | |
| 9th | ∞ | 0.55 | 6.111744 | 0 | Glass (B270) |
| 10th | ∞ | 0.4358876 | 6.251005 | 0 | |
| Total length | | 8.14016623 mm | | | | wherein, each surface of the four lenses is an aspheric surface, the shape of each aspheric surface is provided by an expression as follow:

$$x = \frac{cr^2}{1+\sqrt{1-(k+1)c^2r^2}} + \sum A_{2i}r^{2i}$$

wherein, x is a depth from the surface to a tangent plane of a vertex of the surface, r is a height from the optical axis of the system to the surface, c is a vertex curvature, k is a conic constant, and $A_{2i}$ are 2i-th order correction coefficients of the aspheric surface.

TABLE 2

| Surface | $A_4$ | $A_6$ | $A_8$ | $A_{10}$ |
|---|---|---|---|---|
| 1st | −0.019578 | −0.012724 | 0.0069822 | −0.006975 |
| 2nd | −0.014654 | −0.011064 | 0.0064993 | −0.002921 |
| 3rd | 0.058616 | 0.001572 | 0.000778 | 0.000902 |
| 4th | 0.0135062 | −0.001376 | −0.000243 | −0.000234 |
| 5th | −0.016941 | 0.0050891 | −0.000369 | $1.918 \times 10^{-5}$ |
| 6th | 0.0239768 | −0.00071 | 0.0005755 | $8.638 \times 10^{-5}$ |
| 7th | 0.02533772 | −0.006125005 | 0.001598584 | $-8.28295 \times 10^{-5}$ |
| 8th | −0.007370696 | −0.001067225 | 0.000188819 | $-1.46778 \times 10^{-5}$ |

Referring to FIG. 1 and Table 1, the size of the hybrid lens system 100 is relatively small, the total length is only 8.14016623 mm, approximately 8.14 mm. In operation, light beams from an object side of the hybrid lens system 100 sequentially pass through the aperture stop 50, the first lens 10, the second lens 20, the third lens 30, the fourth lens 40, and the cover glass 60, and then converged onto the image pickup device 70.

Figure 2:
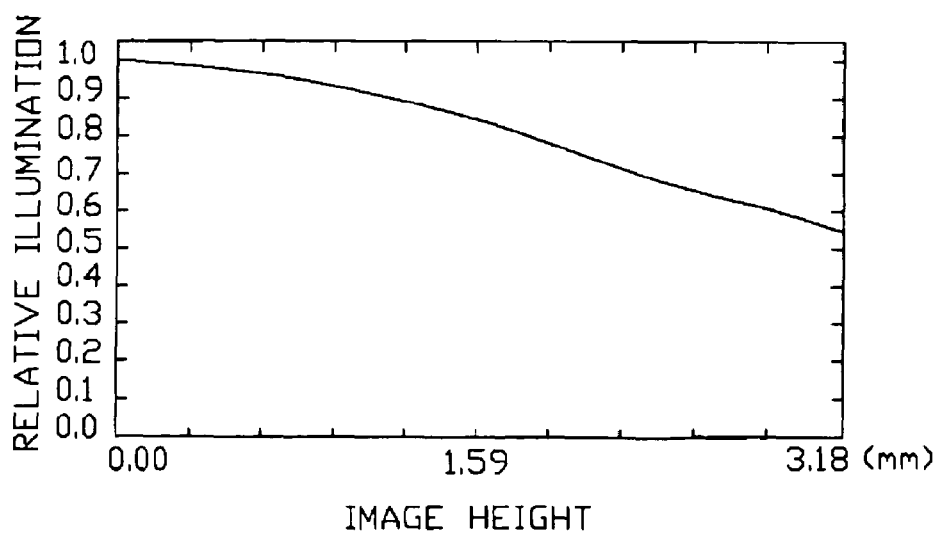
FIG. 2 is a graph illustrating a relationship between relative illumination and image height of the hybrid lens system of FIG. 1.
Figure 3:
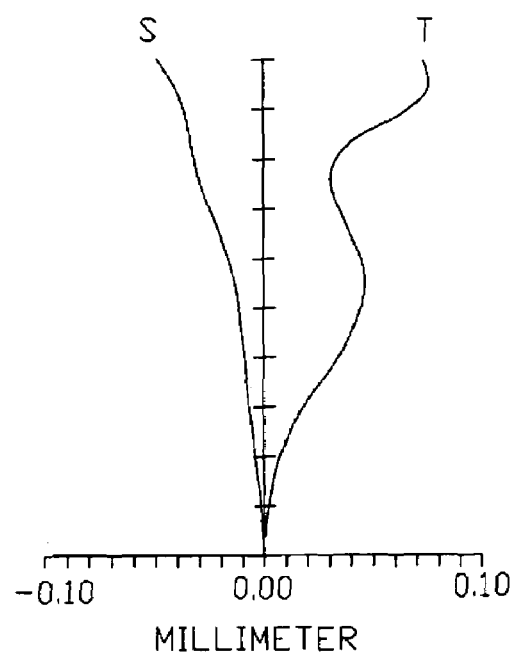
FIGS. 3-4 are graphs showing the field curvature and distortion for the hybrid lens system of FIG. 1.
Figure 4:
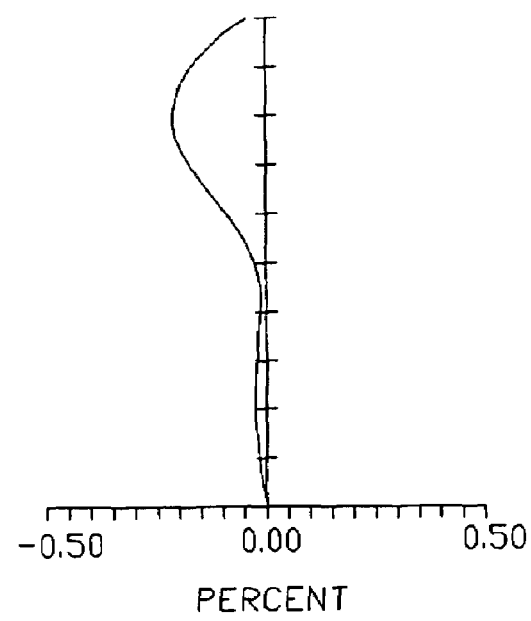
Figure 5:
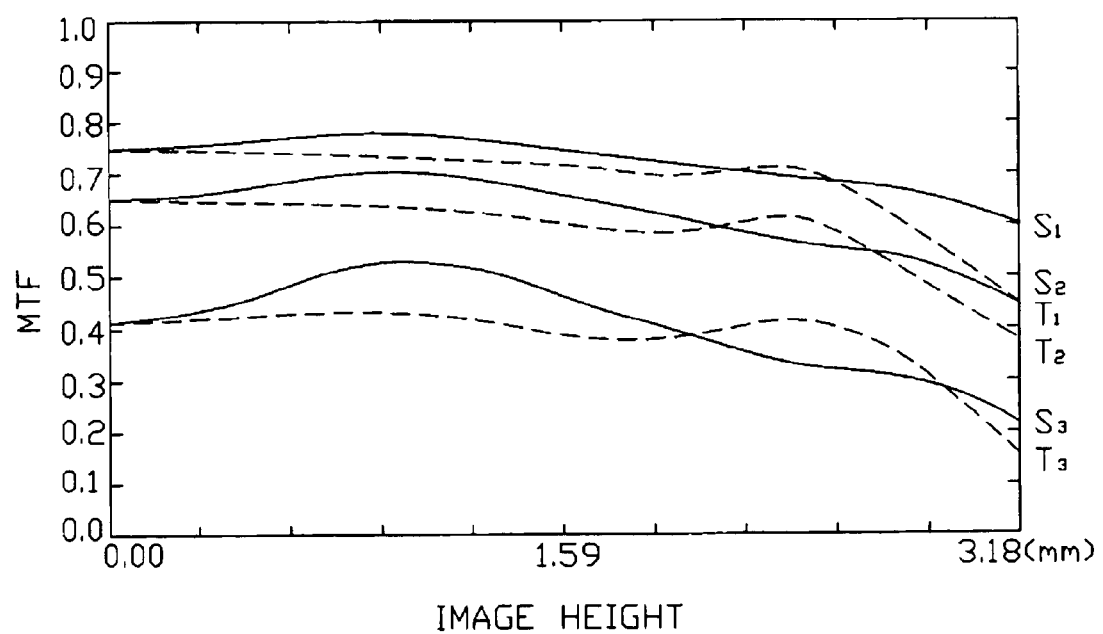
FIG. 5 is a graph showing MTF (modular transfer function) curves of the hybrid lens system of FIG. 1.

FIG. 2 is a graph illustrates a relationship between relative illumination and image height of the hybrid lens system 100 of the preferred embodiment. FIGS. 3-4 are graphs respectively show the field curvature and distortion for the hybrid lens system 100 of the preferred embodiment. FIG. 5 is a graph illustrates MTF curves for the three line frequences of 90 lp/mm (line pairs/mm), 120 lp/mm and 200 lp/mm, from the center (0.00 mm) to the edge (3.18 mm) of the image of the hybrid lens system 100 of the preferred embodiment. The solid lines $S_1$, $S_2$ and $S_3$ are the radial MTF curves for the three line frequences of 90 lp/mm (line pairs/mm), 120 lp/mm and 200 lp/mm of the image of the hybrid lens system 100 respectively, and the broken lines $T_1$, $T_2$ and $T_3$ are the tangential MTF curves for the three line frequences of 90 lp/mm (line pairs/mm), 120 lp/mm and 200 lp/mm of the image of the hybrid lens system 100 respectively.

As stated above, in the hybrid lens system in accordance with the preferred embodiment, the first lens as the outside lens is made from a glass material, scratch resistance and temperature endurance thereof are relatively high. The other lenses are made from plastic materials, which results cost reduction. In addition, all the four lens of the hybrid lens system are aspheric lenses, therefore the hybrid lens system can appropriately correct fundamental aberrations, and excellent optical performance can be achieved.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A hybrid lens system comprising:
   a first lens with positive refractive power, the first lens being made from a glass material and having a convex first surface and a convex second surface;
   a second lens with negative refractive power, the second lens being made from a plastic material;
   a third lens with positive refractive power, the third lens being made from a plastic material; and
   a fourth lens with negative refractive power, the fourth lens being made from a plastic material;
   wherein the first lens, the second lens, the third lens and the fourth lens are aligned in that order from an object side to an image side, each of the four lenses is an aspheric lens, the second lens has a concave third surface facing the object side and a convex fourth surface, the third lens has a convex fifth surface and a convex sixth surface, the fourth lens has a concave seventh surface and a concave eighth surface, the first surface, the second surface, the third surface, the fourth surface, the fifth surface, the sixth surface, the seventh surface and the eighth surface are aligned in that order from the object side to the image side, and each of said surfaces is aspheric.

2. The hybrid lens system of claim 1, wherein the material of the first lens has a refractive index n1=1.58313 at d-line, and an Abbe number v1=59.4 at d-line.

3. The hybrid lens system of claim 1, wherein the material of the second lens has a refractive index n2=1.60726 at d-line, and an Abbe number v2=26.645 at d-line.

4. The hybrid lens system of claim 1, wherein the material of the third lens has a refractive index n3=1.53116 at d-line, and an Abbe number v3=56.4 at d-line.

5. The hybrid lens system of claim 1, wherein the material of the fourth lens has a refractive index n3=1.53116 at d-line, and an Abbe number v3=56.4 at d-line.

6. The hybrid lens system of claim 1, wherein the third lens and the fourth lens are made from a same material.

7. The hybrid lens system of claim 1, wherein at least one of the surfaces of the first lens comprises an infrared-cut film formed thereon.

8. The hybrid lens system of claim 1, wherein the hybrid lens system further comprises an aperture stop positioned between the first lens and the object side, and a cover glass positioned between the fourth lens and the image side.

9. The hybrid lens system of claim 8, wherein the cover glass has a planar ninth surface and a planar tenth surface being aligned in that order from the object side to the image side.

10. The hybrid lens system of claim 9, wherein data of the hybrid lens system satisfies:

| Surface | r (mm) | d (mm) | Φ (mm) | k | lens material (type) |
|---|---|---|---|---|---|
| stop | ∞ | 0.03398873 | 1.967867 | 0 | — |
| $1^{st}$ | 7.312152 | 1.358034 | 2.048028 | 0 | Glass (L-BAL42) |
| $2^{nd}$ | −2.571817 | 0.6735465 | 2.659565 | 0 | |
| $3^{rd}$ | −1.527524 | 0.6008621 | 2.69724 | 0 | Plastic (OKP4) |
| $4^{th}$ | −6.545839 | 0.6766579 | 3.431644 | 0 | |
| $5^{th}$ | 4.508254 | 1.770372 | 4.337425 | 0 | Plastic (E48R) |
| $6^{th}$ | −2.370574 | 0.7833835 | 4.166895 | 0 | |
| $7^{th}$ | −2.180037 | 1.033449 | 4.150956 | 0 | Plastic (E48R) |
| $8^{th}$ | 13.91974 | 0.2239849 | 5.816513 | 0 | |
| $9^{th}$ | ∞ | 0.55 | 6.111744 | 0 | Glass (B270) |
| $10^{th}$ | ∞ | 0.4358876 | 6.251005 | 0. | |

11. The hybrid lens system of claim 1, wherein correction coefficients of the aspheric surfaces satisfy:

| Surface | $A_4$ | $A_6$ | $A_8$ | $A_{10}$ |
|---|---|---|---|---|
| $1^{st}$ | −0.019578 | −0.012724 | 0.0069822 | −0.006975 |
| $2^{nd}$ | −0.014654 | −0.011064 | 0.0064993 | −0.002921 |
| $3^{rd}$ | 0.058616 | 0.001572 | 0.000778 | 0.000902 |
| $4^{th}$ | 0.0135062 | −0.001376 | −0.000243 | −0.000234 |
| $5^{th}$ | −0.016941 | 0.0050891 | −0.000369 | $1.918 \times 10^{-5}$ |
| $6^{th}$ | 0.0239768 | −0.00071 | 0.0005755 | $8.638 \times 10^{-5}$ |
| $7^{th}$ | 0.02533772 | −0.006125005 | 0.001598584 | $-8.28295 \times 10^{-5}$ |
| $8^{th}$ | −0.007370696 | −0.001067225 | 0.000188819 | $-1.46778 \times 10^{-5}$. |

12. A lens system defining an object side and an image side, the lens system comprising:

a first lens with positive refractive power, being made of a glass material and being a biconvex lens;

a second lens with negative refraction power;

a third lens being a biconvex lens with positive refractive power; and a fourth lens with negative refractive power, wherein the first lens, the second lens, the third lens, and the fourth lens are orderly disposed along an optical axis of the lens system from the object side to the image side and each lens has at least one aspheric surface through which the optical axis extends.

13. The lens system of claim 12, wherein the second lens has a concave surface facing the object side and a convex surface facing the image side.

14. The lens system of claim 13, wherein the fourth lens is a biconcave lens.

15. The lens system of claim 12, wherein two opposite surfaces of each of the lenses along the optical axis are aspheric.

16. The lens system of claim 12, wherein the second lens, the third lens and the fourth lens are made from plastic.

17. The lens system of claim 12, wherein data of the lens system satisfies:

| Surface | r (mm) | d (mm) | Φ (mm) | k | lens material (type) |
|---|---|---|---|---|---|
| stop | ∞ | 0.03398873 | 1.967867 | 0 | — |
| $1^{st}$ | 7.312152 | 1.358034 | 2.048028 | 0 | Glass (L-BAL42) |
| $2^{nd}$ | −2.571817 | 0.6735465 | 2.659565 | 0 | |
| $3^{rd}$ | −1.527524 | 0.6008621 | 2.69724 | 0 | Plastic (OKP4) |
| $4^{th}$ | −6.545839 | 0.6766579 | 3.431644 | 0 | |
| $5^{th}$ | 4.508254 | 1.770372 | 4.337425 | 0 | Plastic (E48R) |
| $6^{th}$ | −2.370574 | 0.7833835 | 4.166895 | 0 | |
| $7^{th}$ | −2.180037 | 1.033449 | 4.150956 | 0 | Plastic (E48R) |
| $8^{th}$ | 13.91974 | 0.2239849 | 5.816513 | 0 | |
| $9^{th}$ | ∞ | 0.55 | 6.111744 | 0 | Glass (B270) |
| $10^{th}$ | ∞ | 0.4358876 | 6.251005 | 0. | |

18. The lens system of claim 12, wherein correction coefficients of the aspheric surfaces satisfy:

| Surface | $A_4$ | $A_6$ | $A_8$ | $A_{10}$ |
|---|---|---|---|---|
| $1^{st}$ | −0.019578 | −0.012724 | 0.0069822 | −0.006975 |
| $2^{nd}$ | −0.014654 | −0.011064 | 0.0064993 | −0.002921 |
| $3^{rd}$ | 0.058616 | 0.001572 | 0.000778 | 0.000902 |
| $4^{th}$ | 0.0135062 | −0.001376 | −0.000243 | −0.000234 |
| $5^{th}$ | −0.016941 | 0.0050891 | −0.000369 | $1.918 \times 10^{-5}$ |
| $6^{th}$ | 0.0239768 | −0.00071 | 0.0005755 | $8.638 \times 10^{-5}$ |
| $7^{th}$ | 0.02533772 | −0.006125005 | 0.001598584 | $-8.28295 \times 10^{-5}$ |
| $8^{th}$ | −0.007370696 | −0.001067225 | 0.000188819 | $-1.46778 \times 10^{-5}$. |

19. A lens system defining an object side and an image side, the lens system comprising:

a first lens being a biconvex lens with refractive power, and being made of a glass material;

a second lens with negative refractive power;

a third lens with positive refractive power; and a fourth lens being a biconcave lens with negative refractive power, wherein the first lens, the second lens, the third lens, and the fourth lens are orderly disposed along an optical axis of the lens system from the object side to the image side and each lens has at least one aspheric surface through which the optical axis extends.

* * * * *